United States Patent [19]

Takahashi et al.

[11] Patent Number: 4,933,537

[45] Date of Patent: Jun. 12, 1990

[54] APPARATUS FOR CONTROLLING MOVEMENT OF AN OPTICAL MEMORY CARD FOR DATA TRANSFER THEREWITH

[75] Inventors: Shunzo Takahashi; Yukio Hamasaki; Akiyoshi Hashimoto; Hidefumi Suzuki, all of Tokyo, Japan

[73] Assignee: CSK Corporation, Tokyo, Japan

[21] Appl. No.: 4,343

[22] Filed: Jan. 16, 1987

[30] Foreign Application Priority Data

| Jan. 16, 1986 [JP] | Japan | 61-006827 |
| Sep. 18, 1986 [JP] | Japan | 61-219962 |
| Sep. 20, 1986 [JP] | Japan | 61-222726 |

[51] Int. Cl.$^5$ .................. G06K 7/10; G06K 13/08
[52] U.S. Cl. .................. 235/454; 235/484; 235/473; 235/483; 235/475; 235/479; 369/72
[58] Field of Search .............. 369/112, 119, 120, 121, 369/72; 250/227, 566, 568, 569, 555; 365/234; 235/436, 439, 452, 454, 473, 456, 470, 475, 479, 483, 485, 462, 484; 360/97, 98, 99, 2, 97.02, 98.06, 99.06

[56] References Cited

U.S. PATENT DOCUMENTS

| 3,600,557 | 8/1971 | Zappia | 235/479 |
| 3,703,626 | 11/1972 | Shanrock | 235/485 |
| 3,921,969 | 11/1975 | Hickey et al. | 235/479 |
| 3,939,327 | 2/1976 | Humphrey | 235/454 |
| 4,030,589 | 6/1977 | Kessler | 235/473 |
| 4,103,150 | 7/1978 | von Ballmoos | 235/454 |
| 4,135,083 | 1/1979 | Van Alen et al. | 369/112 |
| 4,145,758 | 3/1979 | Drexler et al. | 369/54 |
| 4,269,917 | 5/1981 | Drexler et al. | 430/414 |
| 4,278,756 | 7/1981 | Bouldin et al. | 430/414 |
| 4,278,758 | 7/1981 | Drexler et al. | 430/414 |
| 4,301,361 | 11/1981 | Lees | 235/483 |
| 4,360,728 | 11/1982 | Drexler | 235/462 |
| 4,376,887 | 3/1983 | Greenaway et al. | 235/454 |
| 4,434,360 | 2/1984 | Woosley et al. | 235/472 |
| 4,441,018 | 4/1984 | Wessel | 235/454 |
| 4,492,855 | 1/1985 | Garczynski et al. | 235/485 |
| 4,500,777 | 2/1985 | Drexler | 235/487 |
| 4,542,288 | 9/1985 | Drexler | 235/487 |
| 4,544,835 | 10/1985 | Drexler | 235/487 |
| 4,581,529 | 4/1986 | Gordon | 250/227 |
| 4,598,196 | 7/1986 | Pierce et al. | 235/454 |
| 4,636,891 | 1/1987 | Barski | 360/97 |

FOREIGN PATENT DOCUMENTS

| 58-215771 | 12/1983 | Japan | 369/72 |
| 60-55576 | 3/1985 | Japan | 369/72 |
| 61-224190 | 10/1986 | Japan | 369/72 |
| 61-239481 | 10/1986 | Japan | 369/72 |

Primary Examiner—Alan Faber
Assistant Examiner—Robert A. Weinhardt
Attorney, Agent, or Firm—Lowe, Price, LeBlanc, Becker & Shur

[57] ABSTRACT

A reader-writer apparatus for an optical memory card for reading and/or writing data with respect to the optical memory card having a data storing face, which apparatus includes a card holder including a carriage for carrying and holding the card inserted thereon and transporting the card to a reading or writing position and a feeding mechanism for driving the carriage. The reader/writer in another aspect of the present invention includes an optical waveguide holder holding an optical waveguide, which is connected at a base end thereof to the light emitting and receiving section of a reading head, so that another end of the optical waveguide may oppose a data recording face of the optical memory card. The waveguide holder is moved independently of the movement of the card holder. The reader/writer apparatus of the present invention has a regulating member mounted to a stationary portion of the apparatus for regulating the angular position of the card so that reading and writing can be effected accurately with respect to an optical memory card of a high density storage. The apparatus may also include a dust removing device.

7 Claims, 8 Drawing Sheets

APPARATUS FOR CONTROLLING MOVEMENT OF AN OPTICAL MEMORY CARD FOR DATA TRANSFER THEREWITH

BACKGROUND OF THE INVENTION

1. Field of the Invention

This invention relates to a reader/writer apparatus for an optical memory card which reads and/or writes data from and/or into the optical memory cards and, more particularly, to a reader/writer apparatus for an optical memory card provided with a card holder for holding and transporting the optical memory card.

2. Background of the Prior Art

Recently, card-type optical memory media have come into the limelight, replacing magnetic cards or IC cards, and various forms of optical memory cards have been proposed. However, they have not yet been put to practical use. This is because the reader/writer apparatuses developed heretofore have never been simple and handy. To promote widespread use of the recording media of this type or to generalize them, it is crucial to develop readers/writers, especially readers which are reasonable in cost and reduced in size and weight.

In reader/writer apparatuses of known kind, a holder holding an optical memory card is moved linearly in a certain direction, for example, in a longitudinal direction (assumed as an X-axis) of the optical memory card and an optical system of a reading/writing head is moved in a direction (assumed as Y-axis) perpendicular to said longitudinal direction for carrying out reading/writing scanning.

However, in known reader/writer apparatuses, generally, a Y-axis moving mechanism including a guide frame and a drive and a reading/writing head including an optical system and an adjusting drive are mounted on a holder holding an optical memory card. With this arrangement, a considerable weight is applied to the holder and therefore, the holder is required to have a mechanical strength or rigidity durable against the weight applied thereto. Thus, the holder is inevitably bulky and heavy. As a result of this, a guide frame for an X-axis movement should also be durable against the weight. This, in turn, requires a drive of a large power output for driving the holder. Thus, the entire drive mechanism is bulky and heavy.

For these reasons, it is quite difficult for the reader/writer apparatuses as described above to be handy and portable. Moreover, the inertia will be large because of large weights of the moving parts and therefore, the stop/start control becomes difficult, reducing the accuracy.

The present invention has been made to obviate the problems described above, and it is a primary object of the present invention to provide a reader/writer apparatus for an optical memory card which has a card holder provided with a transporting mechanism for transporting the optical memory card separately from a moving mechanism of a reading/writing head, so as to significantly reduce the weights of the respective movings mechanisms and the size and weight of drives thereof, to make the entire system easily portable and the inertia of moving parts thereof to be reduced to facilitate accurate stop/start control.

The optical memory card, to which the present invention is applied, may store data in various ways and, for example, a laser beam may advantageously be utilized to store the data with a high density. In this case, the positioning of a reading/writing head in the reading or writing is required to be more accurate than in the case of a conventional magnetic card or IC card.

The positioning means may comprise fixed guide members parallel with the longitudinal direction of the card as in the fixing of the magnetic card for holding the card between the guide members.

The positioning means may alternatively include springs to fix the card by holding the longitudinal edges of the card therebetween.

The positioning means as described above, however, involve the following problems.

In the case of the fixed guide members, an additional space of several millimeters is left, for play, between the guide members and the card inserted for facilitating the insertion of the card. Because of this play, inaccuracy in the writing or error in the reading may possibly be caused.

On the other hand, in the case of the fixing arrangement using springs, the arrangement itself would be complicated in structure. In addition, the springs must be actuated or deactuated for every insertion or taking out of the card from the apparatus, which again requires a complicated mechanism. Moreover, in this fixing arrangement, the transporting means are separate from the positioning means and the positioning is carried out after completion of the transportation. Thus, there is a substantial time lag between the insertion of the card into the reader/writer apparatus and the initiation of the reading or writing.

The invention has also been made to obviate the problems as described above, and it is a second object of the present invention to provide a reader/writer apparatus for an optical memory card provided with a practically useful card holder which includes a transporting mechanism for transporting the optical memory card independently of the moving mechanism for the reading/writing head, which enables accurate positioning with a simple structure without providing any play and is capable of starting the reading/writing soon after the insertion of the card into the reader/writer apparatus.

Since the reading and writing, for the optical memory card, are carried out by utilizing a light beam, an error may possibly be caused in the reading or writing when dust adheres to a data storing face of the card. Especially, since the optical memory card is made so as to be suitable easy handling, it is likely to be covered with dust. Therefore, it becomes necessary to remove the dust prior to the reading or writing.

However, the conventional card holders have never had means for removing the dust from the optical memory card.

It is therefore a third object of the present invention to provide a card holder which is capable of removing the dust adhering to the data recording face of the optical memory card prior to the reading or writing of data.

SUMMARY OF THE INVENTION

In accordance with the present invention, there is provided a reader/writer apparatus for an optical memory card for reading and/or writing data with respect to the optical memory card having a data storing face, which apparatus comprises a card holder, including a carriage carrying and holding the card put into the same and transporting the card to a reading and/or writing position, and a feeding mechanism for driving the carriage.

Further according to the present invention, there is provided a reader/writer apparatus for an optical memory card, that includes the card holder as specified above and further comprises a reading/writing head having a light emitting and receiving section, an optical waveguide holder holding an optical waveguide, which has a base end connected to the light emitting and receiving section of the reading/writing head, so that another end of the optical waveguide may oppose the data recording face of the optical memory card, and an optical waveguide moving/guiding mechanism for moving the optical waveguide holder in a direction perpendicular to the driving direction of the carriage while guiding the same, said light emitting and receiving section of the reading/writing head being provided on a non-movable portion of the apparatus.

Further according to the present invention, there is provided a reader/writer apparatus for an optical memory card, including the card holder as described above, which further comprises a regulating member provided so as to extend from the reading and/or writing position to a card inserting opening and to abut against one side of the card carried and held by the carriage for regulating the angular position of the card.

Still further according to the present invention, there is provided a reader/writer apparatus for an optical memory card, which includes the card holder as specified above and further comprises a housing for encasing components of the reader/writer apparatus including the carriage, said carriage being adapted to hold the card so that the data storing face of the card may face downwardly, an air blowing nozzle provided within the housing so as to face the data storing face of the card held by the carriage, an air flow generating source coupled to the air blowing nozzle, a fan provided under the carriage for discharging the air in the housing, thereby to remove dust adhering to the data storing face of the card held by the carriage.

In a reader/writer apparatus for an optical memory card according to the present invention, only the holder and the optical memory card held thereon are carried by a feeding mechanism. Thus, no excessive weight is applied to the feeding mechanism. Therefore, a drive means, such as a motor, for driving the holder, can be small in size and weight.

As to a reading/writing head, only an optical waveguide light in weight is supported by an optical waveguide moving/guiding mechanism and a heavy light emitting and receiving unit is not mounted on the optical waveguide moving/guiding mechanism but is provided on a fixed structure. Therefore, only a lightweight load is applied to the optical waveguide moving/guiding mechanism, so that the mechanism can be simple in structure and formed small in size and light in weight.

Thus, according to the present invention, both the optical memory card side and the reading/writing head side can be made light in weight, enabling the entire apparatus to be made light enough to be easy to carry. Moreover, since the inertia of the moving part is reduced, the starting and stopping control can be effected easily and accurately.

In accordance with the present invention, a regulating member may further be provided on the carriage, which is adapted to abut against a side of the card placed on the carriage to regulate the angular posture of the card. In this case, one side of the card placed on the carriage is brought into contact with the regulating member as the carriage moves. Therefore, in the course of the transportation of the card from a card inserting position to a reading and/or writing position, the card is guided by the regulating member. Thus, when the card reaches the reading and/or writing position, the card will be guided to be positioned accurately.

Thus, accurate positioning can be attained with a simple structure without play. In addition, there is no substantial time lag between the insertion of the card into the reader/writer apparatus and the starting of the reading or writing. Furthermore, the present invention may be provided with a dust removing apparatus. This removes dust adhering to the card, during the transportation of the card from the insertion position to the reading/writing position, by blowing air to the card. Therefore, an optical memory card otherwise liable to be covered with dust would be free from an error in reading or writing due to the dust adhering thereto.

DESCRIPTION OF THE PREFERRED EMBODIMENTS

Structure of the First Embodiment

Figure 1:
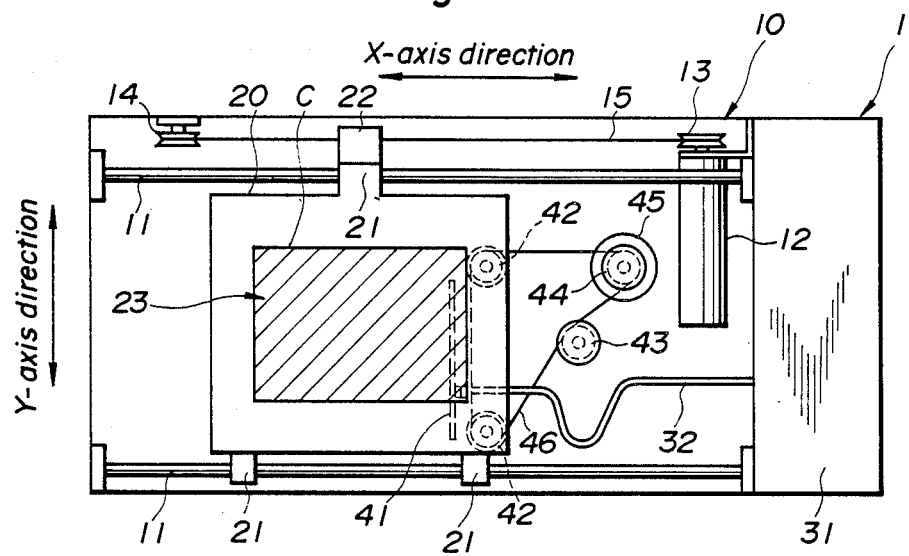
FIG. 1 is a plan view of one form of a reader/writer apparatus for an optical memory card embodying the present invention.
Figure 2:
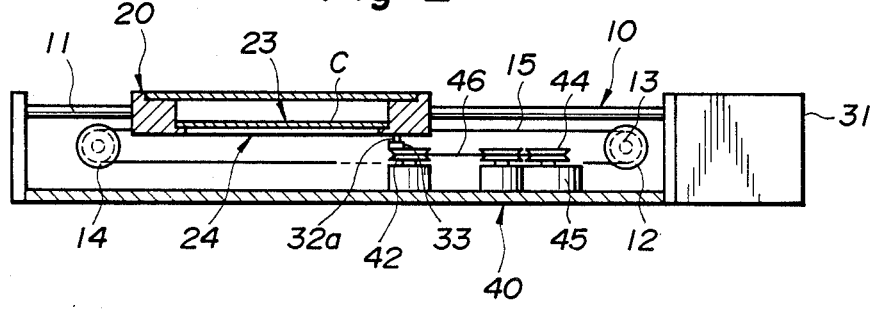
FIG. 2 is a cross sectional view of the reader/writer apparatus of FIG. 1.
Figure 3:
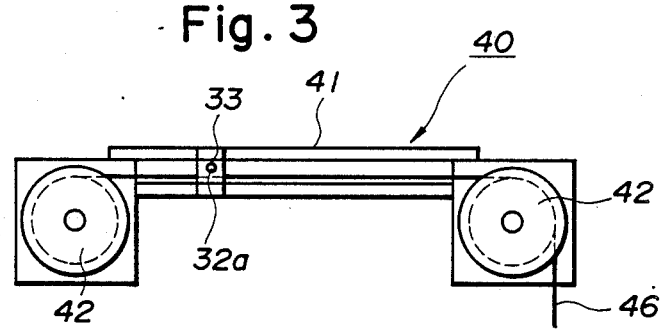
FIG. 3 is a plan view of a main portion of an optical waveguide moving/guiding mechanism employable in the embodiment.
Figure 4:
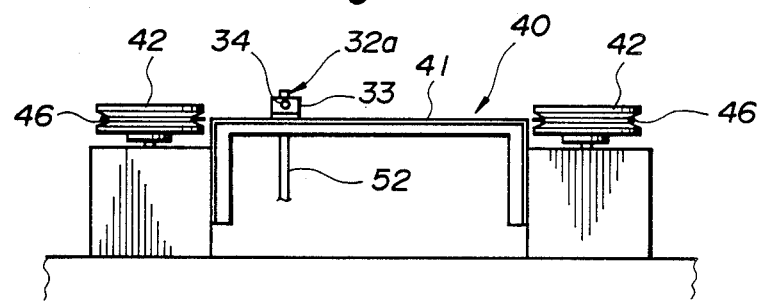
FIG. 4 is a front view of the optical waveguide moving/guiding mechanism of FIG. 3.
Figure 5:
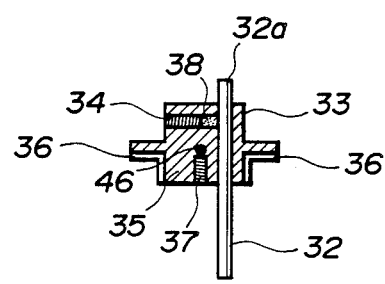
FIG. 5 is an enlarged sectional view of an optical waveguide holding arrangement employable in the embodiment.

A first embodiment of the present invention, as illustrated in FIGS. 1 and 2, comprises a carriage which carries and accurately holds a card thereon and transports the same to a reading/writing position and a feeding mechanism for driving the carriage.

In FIGS. 1 and 2, the reader/writer apparatus for an optical memory card according to the present embodiment has the feeding mechanism 10 for linearly guiding and moving the carriage 20, which carries an optical memory card C thereon, along a longitudinal direction (X-direction) of a support structure 1 perpendicularly with data tracks on the card. At a central portion of the support structure, where the carriage 20 is locatable, are provided an optical waveguide holding assembly 33 for holding a tip end 32a of an optical waveguide 32 so as to oppose the same to the data track of the optical memory card and an optical waveguide moving/guiding mechanism 40 for guiding and moving the optical waveguide holding assembly 33 linearly in a direction of the data track. A light emitting and receiving unit 31 constituting a reading/writing head together with the optical waveguide 32 is fixed to an end portion of the support structure 1.

The light emitting and receiving unit 31 includes a laser light emitting element, a photodetecting element, driving circuits therefor, a data reproducing circuit for reproducing reflection signals detected and a data writing circuit for outputting the data to be written in the form of optical signals. The light emitting and receiving unit 31 performs data writing by irradiation of light onto the data tracks of the optical memory card and data reproduction by detection of reflected light. Of course, the unit 31 may be adapted solely for reading or for writing.

The feeding mechanism 10 comprises guide frames 11 provided along the longitudinal sides of the support structure 1, respectively, an X-axis servo-motor 12 functioning as a drive for moving the carriage 20 in an X-axis direction placed on the guide frames 11 and a wire 15 trained over a pulley 13 which is driven by the motor 12 and over another pulley 14 and fixed at an end portion to the carriage 20.

The carriage 20 comprises supports 21 for supporting the carriage 20 while allowing the same to be movable, a connecting portion 22 for connecting and fixing the wire 15 thereto, a card setting portion 23 for accommodating and setting the optical memory card C and a window 24 formed at a bottom of the card setting portion 23.

The optical waveguide holding assembly 33 is adapted to hold the tip ends 32 of the optical waveguide 32 so that they may be substantially vertical with respect to the window 24 and adapted to change height as desired. The adjustment or changing of the height may be effected, for example, by loosening a bolt 34 pressing the waveguide 32 through a cushioning material such as felt to fix the same and pulling out or retracting the ends of the waveguide 32.

The optical waveguide holder 33 has flanges 36 at opposite sides thereof. Through the flanges 36, the optical fiber holder 33 is movably supported on the guide frame 41 of the optical waveguide moving/guiding mechanism 40. A through-hole 35 is formed centrally in the optical waveguide holder 33 so as to extend in the moving direction of the optical waveguide holder 33. A wire 46 is inserted through the through-hole 35 and fixed by a bolt 37.

The optical waveguide 32 includes optical fibers for light irradiation and optical fibers for light receiving, which are bundled altogether, and opens at the tip end 32a.

The optical waveguide moving/guiding mechanism 40 has the guide frame 41 provided centrally in the support structure 1 for guiding the tip end 32a of the optical waveguide 32 in a direction perpendicular to the guide frames 11. The guide frame 41 comprises members disposed in parallel with each other. The optical waveguide 32 is passed through a space defined between the parallel members. The optical waveguide holder 33 is supported in such a way that the flanges 36 are placed on the parallel members.

Pulleys 42, 42 are provided at opposite ends of the guide frame 41. The wire 46 is trained over the pulleys 42, 42 so as to be held in parallel with the guide frame 41 and further trained over another pulley 44 through still another pulley 43. The pulley 44 is driven to rotate by a Y-axis stepping motor 45 to drive the wire 46.

Operation of the First Embodiment

The reading or writing of data from or into the optical memory card by the reader/writer apparatus as described above is carried out as follows. In the following description, the reading of the data is exemplarily referred to, but the writing of the data may be effected analogously.

First, the optical memory card C is put and set on the card setting portion 23 of the carriage 20 so that the data storing face is facing downward. Thus, the data storing face is optically accessible from the lower side through the window 24.

Then the carriage 20 is located at an initial position through the wire 15 driven by the X-axis servomotor 12. Similarly, the optical waveguide holder 33 is set to an initial position through the wire 46 driven by the Y-axis stepping motor 45. In these setting operations, the locations of the carriage 20 and the optical waveguide holder 33 to the respective initial positions are detected, for example, by limit switches (not shown) to automatically stop them at their respective positions.

In the reading, the Y-axis stepping motor 45 is rotated at a constant rate and the rotation is transmitted to the wire 46 through the pulley 44 to convert it to the movement in a longitudinal direction of the wire 46. This moves the optical waveguide holder 33, to which a portion of the wire 46 is fixed, along the guide frame 41.

At this time, a laser beam is transmitted from the light emitting and receiving unit 31 through the optical waveguide 32 and emitted from the tip end 32a of the waveguide to irradiate the data track of the optical memory card C through the window 24. The irradiated beam is reflected with a reflectivity corresponding to the data storage state on the data track. The reflected beam is incident upon the tip end 32a of the optical waveguide and transmitted to the light receiving unit through the waveguide 32. Thus, the data stored on the data track is read out.

After the data of one track has thus been read out, a stop signal on the track is detected, which actuates a control unit (not shown) to move the carriage 20 to a succeeding track by the X-axis servomotor through the wire 15.

In the reading, to read the data randomly from the tracks, the number of the tracks may be counted so that the X-axis servomotor 12 can be driven to the track of a desired number.

The Y-axis stepping motor 45 is rotated reversely by a control unit (not shown) to move the optical waveguide holder 33 to an initial position of the data track to be read out.

Thereafter, the operations as described above are repeated to read the data of said data track.

In this connection, it is to be noted that since the carriage 20 bears its own weight and the weight of the optical memory card, the carriage 20 can be made light in weight and it will not apply any substantial load onto the guide frame 11, the wire 15 and the X-axis servomotor 12.

Similarly, in the optical waveguide moving/guiding mechanism 40, only the weights of the optical waveguide 32 and the optical waveguide holder 33 are applied onto the guide frame 41. Thus, no substantial load is applied to the guide frame 41, the wire 46 and the optical waveguide holder 33.

For these reasons, the relevant members may advantageously be made of materials light in weight and may be formed smaller. In addition, since the inertia is reduced, the control for starting and stopping of movable elements easier.

Although the movements of the card holder and the optical waveguide holder are effected through the wire in the first embodiment as described above, another means may of course be employed, alternatively. For example, a feed screw may be employed as in other embodiments as will be described later.

Further, the optical waveguide is moved in the direction of the data track in the present embodiment, but the moving direction is not limited thereto. For example, the holder may be moved in the direction of the data track and the optical waveguide may be moved in a direction perpendicular to the data track.

The reading and writing of the optical memory card are effected from the lower side of the carriage in the embodiment just described, but they may of course be carried out from the upper side of the carriage. Obviously, the card must then have its optical data faces facing upward In this case, the window 24 may of course be omitted.

Structure of the Second Embodiment

Figure 6:
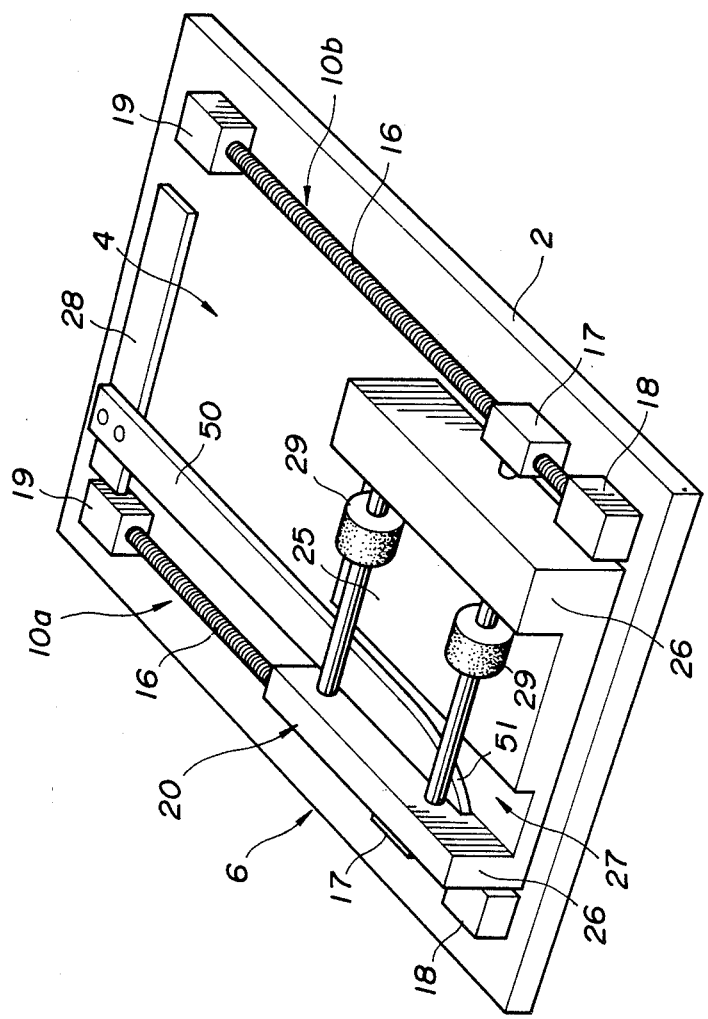
FIG. 6 is a perspective view of a card holder employable in a second form of a reader/writer apparatus for an optical memory card embodying the present invention.
Figure 7:
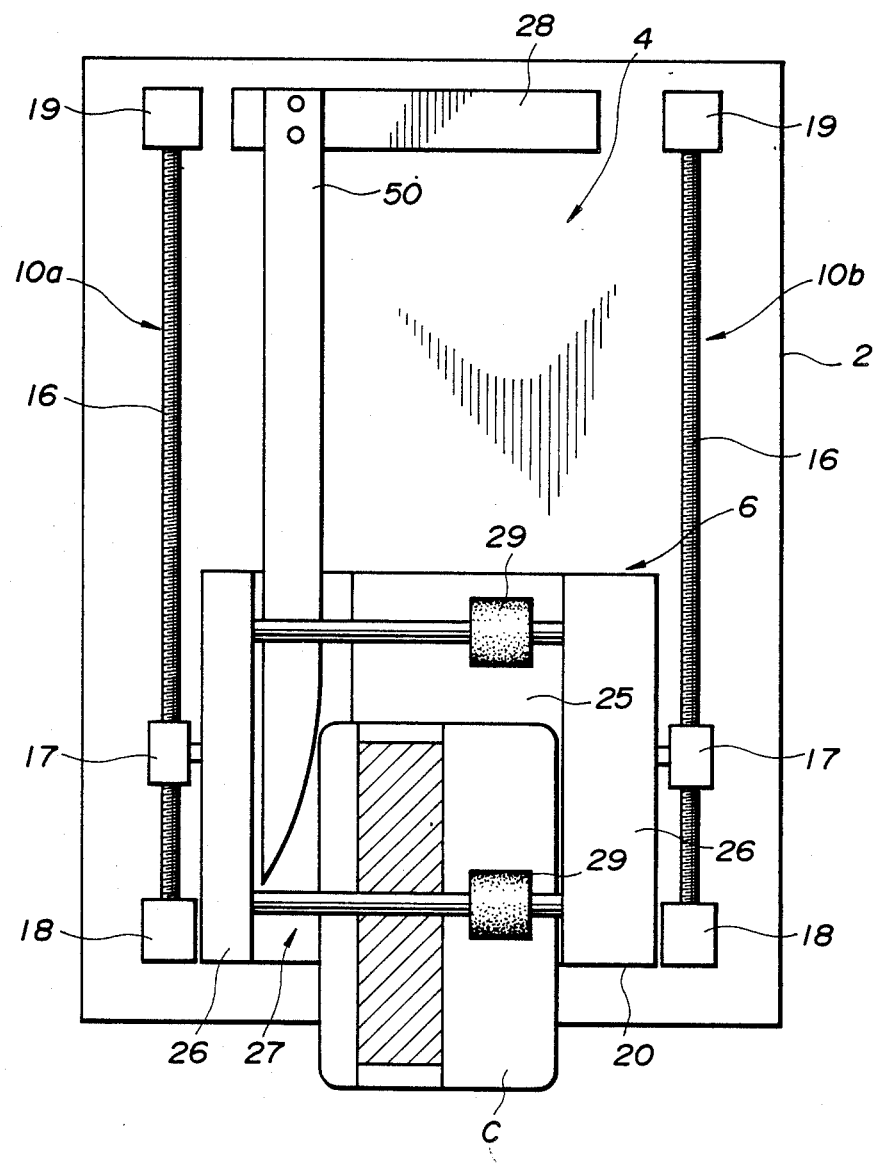
FIG. 7 is a plan view of the card holder of FIG. 6.

FIGS. 6 and 7 illustrate a card holder constituting a second form of a reader/writer apparatus for an optical memory card embodying the present invention.

The card holder as illustrated in these figures is provided on a base 2, on which a reading/writing position 4 and a card inserting position 6 are provided. The card holder comprises a carriage 20, feeding mechanisms 10a, 10b and a regulating member 50.

The carriage 20 is formed in a concaved shape in section, which comprises a horizontal portion 25 and vertical portions 26. A groove 27 is formed on the horizontal portion 25 at a position adjacent to one of the vertical portion 26. Two guide rollers 29, 29 are provided between the vertical portions 26, 26.

The feeding mechanisms 10a, 10b are formed identically with each other and supported by the bearings 18, 19. Each of the feeding mechanisms 10a, 10b comprises a feed screw 16 to be rotated by a rotation driving means and a moving member 17 meshed with the feed screw 16 and connected and fixed to the vertical portion 26 of the carriage 20.

The regulating member 50 is fixed, at one end thereof, to a stopper 28 for the carriage so as to be cantilevered over the base 2. The free end portion of the regulating member 50 is placed in the groove 27 of the horizontal portion 25 of the carriage 20 along the length thereof, so as to be positioned, in height around the level of the horizontal portion 25. The regulating member 50 is precisely disposed so that the longitudinal side edge thereof, which is opposite to an inner wall of one of the vertical portions 26 across the guide rollers 29, may extend in parallel with said inner wall, keeping a predetermined space therefrom. The regulating member 50 has a tip end 51 formed in a curve like a knife (in plan view, per FIG. 7) to facilitate the insertion of the card.

In the reader/writer apparatus for the optical memory card according to the second embodiment, a reading/writing head (not shown) is arranged over the reading/writing position 4 on the base 2 of the card holder. The head is located above the carriage 20 so as to face the data storing surface of the optical memory card and reads/writes the data from the location.

Of course, the card holder may be reversed to turn upside down for allowing the reading/writing head to be disposed thereunder.

Operation of the Second Embodiment

The operation of the card holder according to the second embodiment arranged as described above will now be described.

Figure 8:
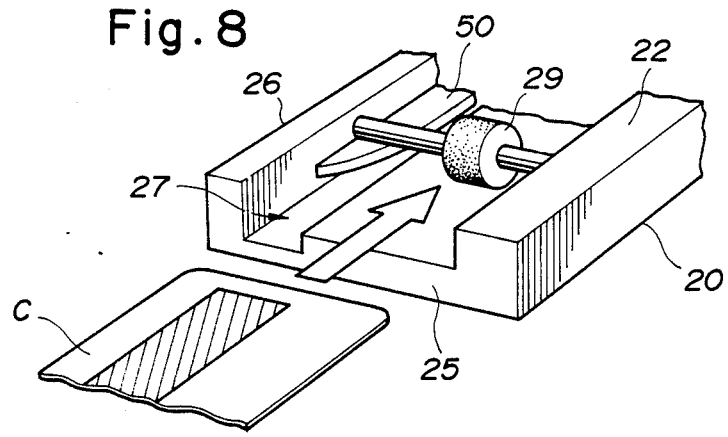
FIG. 8 is a perspective view of a main portion of the card holder of FIG. 6 for showing the operation thereof.

As illustrated in FIG. 8, the card C is moved in the direction of the arrow to be inserted into the carriage 20. The card C follows the curve of the tip end 51 of the regulating member 50 to be guided to the one side of the carriage 20. The card is further guided on the horizontal portion 25 in the direction of the arrow, while being pressed by the guide rollers 29 from above. FIG. 7 explanatorily illustrates the operation.

After the card C has been completely guided into position on the carriage 20, a limit switch (not shown) detects the state to actuate the feeding mechanisms 10a, 10b. The feed screws 16 are, then, rotated to move the moving members 17, which are meshed with the feed screws 16, respectively, along the feeding mechanisms 10a, 10b.

As the moving member 17 moves, the carriage 20 connected thereto is moved on the base 2. At this time, the orientation of two longitudinal edges of the card C placed on the carriage 20 is maintained by coaction of the regulating member 50 and the vertical portion 26 and the card is guided by the regulating member 50 as the carriage 20 is moved. The guide roller 29 function to prevent the card C from being detached or raised from horizontal surface 25 of carriage 20.

After the carriage 20 has reached the reading/writing position 4 to contact the stopper 28, the movement of the carriage 20 stopped. In this state, the card C is located in a desired position, while being regulated by the regulating member 50.

As described above, according to the present embodiment, the positioning is effected accurately without play with a simple structure, and the data reading/writing is carried out soon after the card is put into the reader/writer apparatus. Thus, a practical, useful card holder is provided.

The reading or writing is carried out by the reading/writing head from the upper side of the carriage in the described embodiment, but the carriage may be provided with a window to effect the reading or writing through the window. In this case, the base may also have a window as was comparably described for the first embodiment.

Structure of the Third Embodiment

Figure 10:
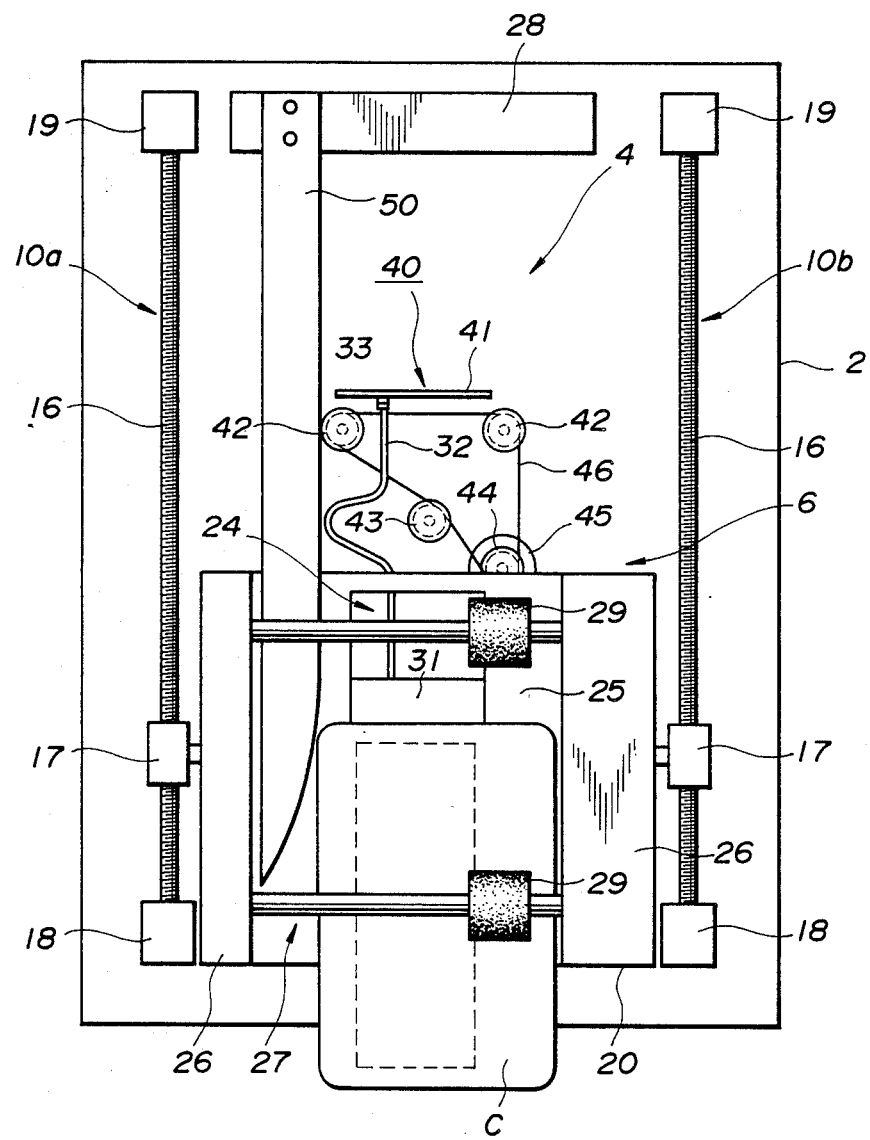
FIG. 10 is a plan view of another form of card holder comprising a third form of a reader/writer apparatus for an optical memory card embodying the present invention.

FIG. 10 is a plan view of a third form of reader/writer apparatus for an optical memory card embodying the present invention.

In the third embodiment, a window 24 is formed on the horizontal portion 25 of the carriage 20 of the card holder according to the second embodiment and an optical waveguide moving/guiding mechanism 40 functioning as a reading/writing head, is provided on the base 2. The explanations of parts or portions of parts identical with those of the first or second embodiment are omitted here.

At a central portion of the base 2 where the horizontal portion 25 of the carriage 20 is faced, are provided an optical waveguide holder 33 for holding an optical waveguide 32 so that a tip end 32a of the waveguide 32 may oppose a data track of the optical memory card C and the optical waveguide moving/guiding mechanism, 40 for moving the optical waveguide holder 33 linearly along the direction of the data track while guiding the same. A light emitting and receiving unit 31 constituting a reading/writing head together with the optical waveguide 32 is fixed on the base 2.

Operation of the Third Embodiment

To read data from the optical memory card by the reader/writer apparatus constructed as described above, the following procedures are followed. The operation of the card holder as described in connection with the first or second embodiment will not be explained here.

The optical memory card C is put onto the horizontal portion 25 of the carriage 20 as in the second embodiment. At this time, the card is used with the data storing surface faced downwardly. Thus, the data storing face can be seen from the lower side through the window 24.

Then, the optical memory card is transported as in the second embodiment, while the posture of the card is regulated by the regulating member 50. The horizontal portion 25 is set to an initial position. At the same time, the optical waveguide holder 33 is set to an initial position by the Y-axis stepping motor 45 through the wire 46. At this time, the setting to respective initial positions is detected by limit switches (not shown) to automatically stop the carriage and the waveguide holder, respectively.

In the reading or writing, the Y-axis stepping motor 45 is rotated at a predetermined rate and the rotation is conveyed to the wire 46 through the pulley 44 to convert the rotation to the movement in the longitudinal direction of the wire 46. This moves the optical waveguide holder 33, which is fixed to a portion of the wire 46, along the guide frame 41.

Thereafter, the reading (writing) of the data is carried out as in the first embodiment. After the data of one track has thus been read out, a stop signal on the track is detected, which actuates a not shown control unit (an X-axis servo-mechanism) to move the horizontal portion 25 to a succeeding track by the feeding mechanisms 10a, 10b.

In the reading, to read the data randomly from the tracks, the number of the tracks may be counted so that the feeding mechanisms 10a, 10b can be driven to the track of a desired number.

The Y-axis stepping motor 45 is rotated reversely by a control unit (not shown) to move the optical waveguide holder 33 to an initial position of the data track to be read out.

Thereafter, the operations as described above are repeated to read the data of said data track.

Since the present embodiment has the advantage of accurate positioning featured in the second embodiment in addition to the card reading feature of the first embodiment, it combines the advantages of both embodiments. Thus, the present embodiment can cope with the reading and/or writing of the optical memory card of a high density.

The optical waveguide moving/guiding mechanism 40 functioning as a reading/writing head is provided on the base 2 in the present embodiment, the base 2 may have a window so that the optical waveguide mechanism 40 may be disposed under the base 2.

Structure of the Fourth Embodiment

Figure 11:
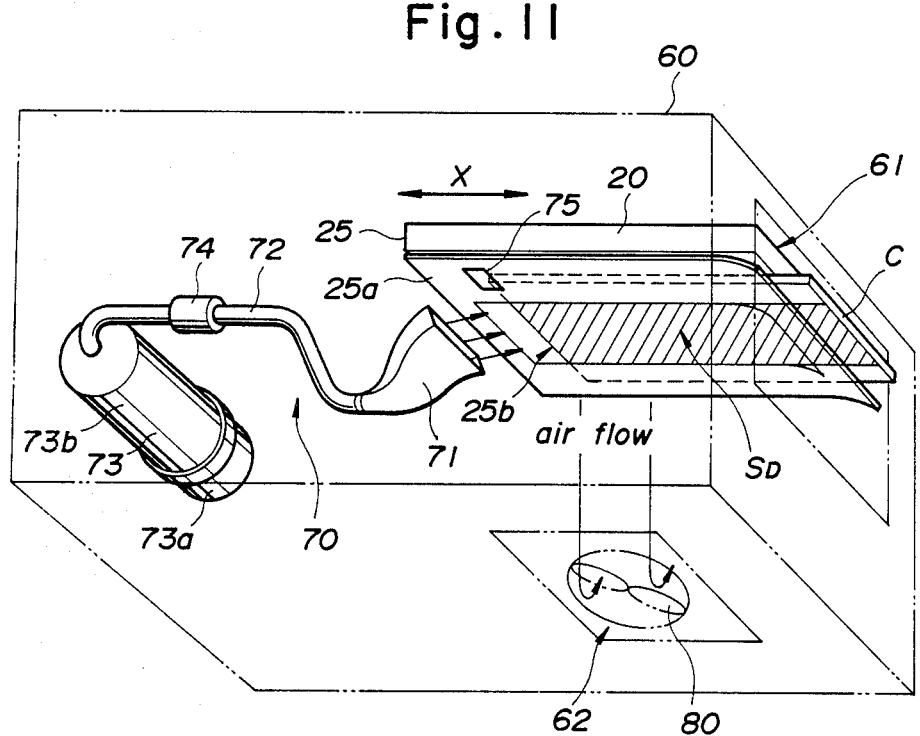
FIG. 11 is an explanatory perspective view of a dust removing apparatus comprising a fourth form of a reader/writer apparatus for an optical memory card embodying the present invention.
Figure 9:
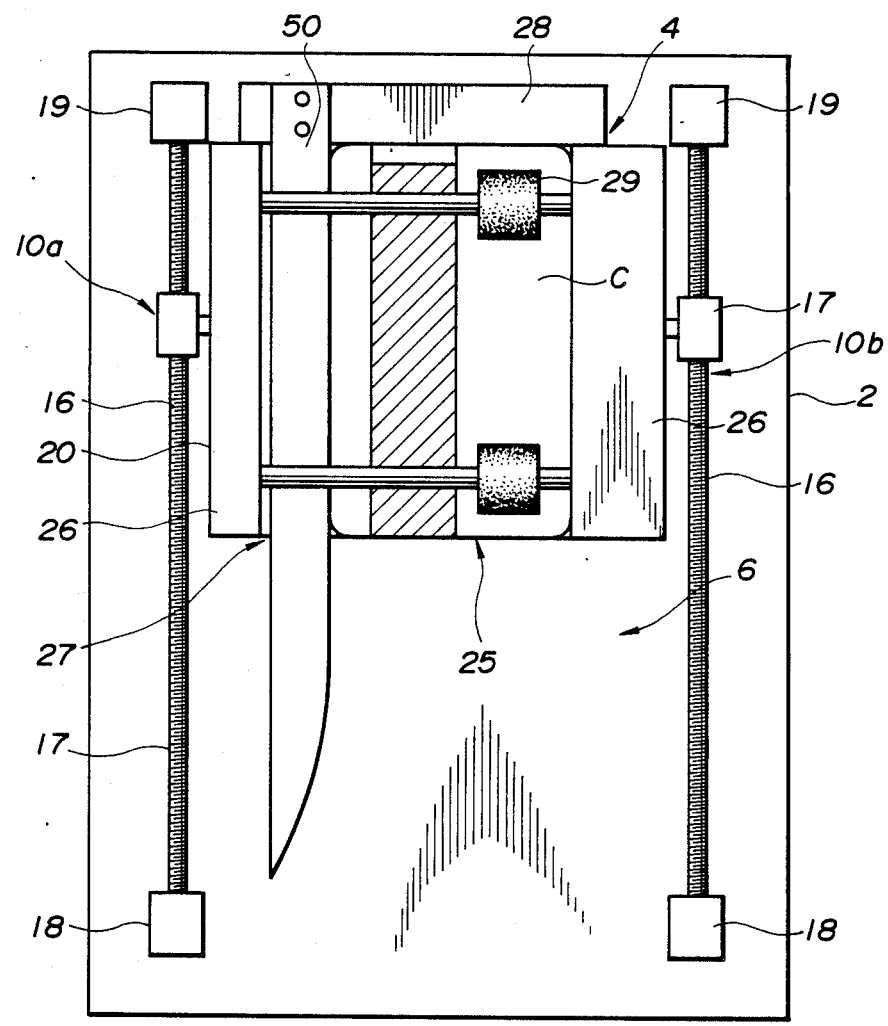
FIG. 9 is a plan view of the card holder of FIG. 6 for showing the operation thereof.

FIG. 11 illustrates a dust removing apparatus in a fourth form of a reader/writer apparatus for an optical memory card.

This embodiment will be described referring to a "reader" apparatus, but the dust removing apparatus according to the present embodiment may be applied equally well to an optical memory card "writer" apparatus or a "reader" apparatus, or to apparatus functioning both as a reader and a writer as in the foregoing embodiments. It is to be noted that only the carriage is shown for the card holder in the figure, but the base is also included in the actual reader apparatus.

In FIG. 11, the dust removing apparatus according to the present embodiment comprises a carriage 20 encased within an apparatus housing 60 (indicated by chain lines), an air blower apparatus 70 and a fan 80.

Within the housing 60 are provided a transporting means (not shown) for transporting the carriage 20 and a reader apparatus (not shown) for reading data from the optical memory card C held by the carriage 20. The housing 60 is closed and is substantially sealed except for a card inserting opening 61 and an opening 62 for mounting the fan 80.

The carriage 20 has a support portion 25a at a lower portion of the horizontal portion 25 for receiving the optical memory card C as an envelope. The support portion 25a has, at a central portion thereof, a window 24 so that light beam from the not shown reader may irradiate a data storing face SD of the optical memory card C therethrough.

Of course, the support portion 25a is not always essential and may be omitted or replaced with another means so long as the optical memory card can be held so as not to fall. For example, the carriage 20 as used in the first, second or third embodiment may be employed.

The air blower apparatus 70 comprises an air blowing nozzle 71, an electrically powered air pump 73 with an air tank and an electromagnetic valve 74 which are connected by a piping 72.

The air blowing nozzle 71 is disposed in the vicinity of one end of the window 24 so as to face the opening of the window 24. The electrically powered air pump 73 with the air tank includes a small electrically powered air pump 73a to compress air. The compressed air is stored in an air tank 73b. The air pump 73a is actuated upon on/off operation of a pressure switch (not shown).

When a limit switch 75 detects the insertion of the optical memory card C into a position, a valve opening signal is output from a control circuit (not shown) to put the electromagnetic valve 74 into an opened state for several seconds in the embodiment as illustrated.

The fan 80 is provided at the fan mounting portion 62 formed on the bottom of the housing 60.

Operation of the Fourth Embodiment

The operation of the fourth embodiment as described above will now be described.

The optical memory card C is inserted between the lower face of the horizontal portion 25 of the carriage and the supporting portion 25a through the card inserting opening 61. In this case, the optical memory card C is disposed with the data storing face SD thereof positioned at the opening of the window 24 of the supporting portion 25a.

The insertion of the card is detected by the limit switch 75 and the detection signal is sent to a control circuit (not shown) to generate a valve opening signal. In response to the valve opening signal, the electromagnetic valve 74 is opened.

Upon opening of the electromagnetic valve 74, the air compressed and stored in the air tank 73b is fed through the piping 72 and jetted from the air blowing nozzle 71 onto the data storing face SD of the optical memory card through the window 24. The jetted air flows along the data storing face SD to blow away any dust adhering on the face of the card.

The dust blown off is conveyed by the air flow as indicated by arrows in FIG. 11 and is sucked by the fan 80 and discharged out of the housing 60.

In the present embodiment, the blown away dust is conveyed by the air flow so that the dust is prevented from being re-deposited on the surface of the card. Moreover, the air in the housing 60 is forced to be discharged by the fan 80 so that the inside of the housing 60 is kept as clean as a clean room.

The electromagnetic valve 74 is opened for several seconds, but it is normally closed. If the pressure of the air tank 73b is lowered during the opening of the valve, the air pump 73a is actuated to feed compressed air to the tank 73b.

Although the air blowing is carried out when the card is inserted in the embodiment as illustrated, air may be blown when the carriage 20 is being moved in the direction of an arrow as shown in FIG. 1. In this case, a high-speed air stream jetted from the nozzle 71 meets all over the data storing face sequentially, the dust blowing off effect is ensured.

The card holder carriage as used in the second embodiment is employed in the fourth embodiment only as an example and features of the present embodiment may be combined with those of any other embodiment as described above.

As described above, the present embodiment just described has an effect of removing dust adhering to the data storing surface of the optical memory card in the reading or writing of the data to prevent any possible fatal error caused by dust adhering to the read card surface.

Modified Embodiments

The regulating member 50 used in the second embodiment may also be employed in another embodiment. For example, it may be employed in the first embodiment as illustrated in FIG. 12.

Figure 12:
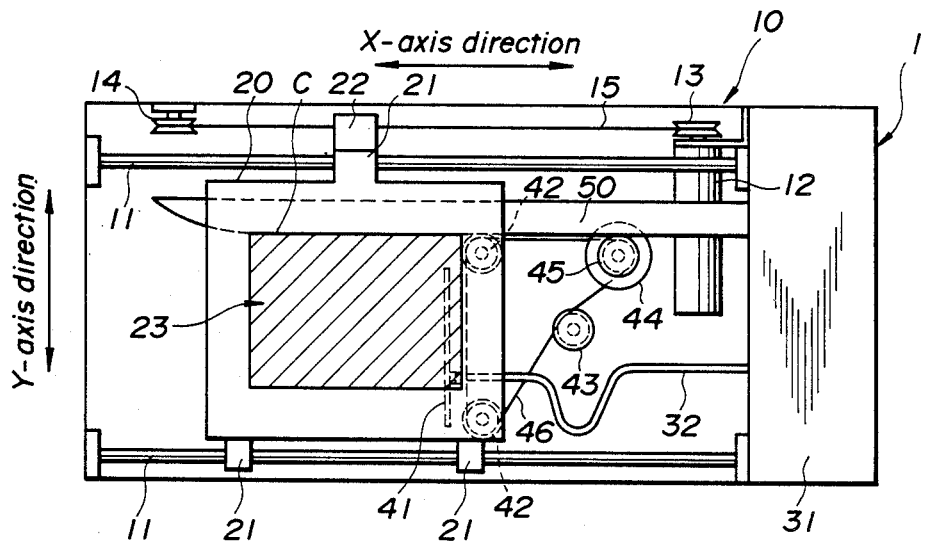
FIG. 12 is a plan view of another embodiment of the present invention.

In FIG. 12, a groove (not shown) is formed under the carriage 20 along the periphery of the card held by the carriage and the regulating member is placed in the groove. The operation of the regulating member is substantially the same as described in relation to the second embodiment.

Figure 13:
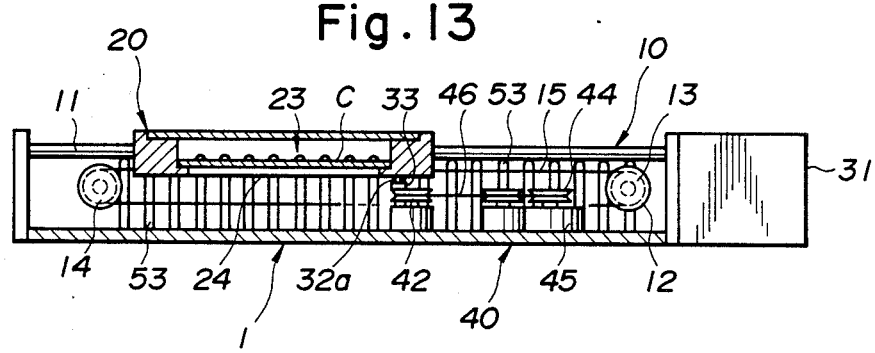
FIG. 13 is a sectional view of still another embodiment of the present invention.

Alternatively, the regulating member may be formed of a plurality of pins instead of having the form a member shaped in a knife configuration as illustrated in FIG. 13.

In FIG. 13, a pinned regulating member 53 is employed in the reader/writer apparatus of the first embodiment. This pinned regulating member has a basic function substantially the same as those of the second and the third embodiment. However, the pinned regulating member has an advantage over them in that the pinning conditions may be adjusted to effect fine adjustment for regulation of the card position.

What is claimed is:

1. A reader/writer apparatus suitable for use with an optical memory card for reading and/or writing data with respect to a data storing face of the optical memory card, comprising:

carriage means for receiving, holding and accurately transporting an optical memory card to a reading and/or writing position;

a regulating member mounted to a stationary portion of the apparatus and disposed to extend from the reading and/or writing position to a card inserting opening of the apparatus and also to abut against one side of the optical memory card that is being held and transported by the carriage means for regulating an angular orientation of the card with respect to its direction of motion; and carriage driving means for driving the carriage, wherein the regulating member comprises a plurality of pin-like extensions extending from the stationary portion of the apparatus and disposed to make initial contact with the optical memory card inserted into the apparatus and thereafter to provide guiding contact to one edge of the same against a surface of the carriage means as the carriage means carries the optical memory card to the reading and/or writing position, said pin-like extensions being located adjustably with respect to the stationary portion as needed to accommodate the shape and size of the optical memory card.

2. A reader/writer apparatus according to claim 1, further comprising:

a reading/writing head having a light emitting and receiving section;

an optical waveguide holder holding an optical waveguide, which has a base end connected to the light emitting and receiving section of the reading/writing head, so that another end of the optical waveguide may oppose the data storing face of the optical memory card; and an optical waveguide moving/guiding mechanism for moving the optical waveguide holder in a direction perpendicular to the driving direction of the Carriage, while guiding the same;

said light emitting and receiving section of the reading/writing head being provided on a non-movable portion of the apparatus.

3. A reader/writer apparatus according to claim 1, further comprising:

a housing for encasing components of the reader/writer apparatus including the carriage;

said carriage being adapted to hold the optical memory card so that the data storing face of the optical memory card may face downwardly.

an air blowing nozzle provided within the housing so as to face the data storing face of the optical memory card held by the carriage;

an air flow generating source coupled to the air blowing nozzle;

a fan provided under the carriage for discharging the air in the housing;

thereby to remove dust adhering to the data storing face of the optical memory card held by the carriage.

4. A reader/writer apparatus according to claim 2, wherein:
   said carriage is provided with a window, through which data reading or writing is carried out with respect to the optical memory card held by the carriage.

5. A reader/writer apparatus according to claim 1, wherein:
   said carriage is provided with a window, through which data reading or writing is carried out with respect to the optical memory card held by the carriage.

6. A reader/writer apparatus according to claim 2, wherein:
   a housing for encasing components of the reader/writer apparatus including the carriage;
   said carriage being adapted to hold the optical memory card so that the data storing face of the optical memory card may face downwardly;
   an air blowing nozzle provided within the housing so as to face the data storing face of the optical memory card held by the carriage;
   an air flow generating source coupled to the air blowing nozzle;
   a fan provided under the carriage for discharging the air in the housing;
   thereby to remove dust adhering to the data storing face of the optical memory card held by the carriage.

7. A reader/writer apparatus according to claim 6, wherein:
   said carriage is provided with a window, through which data reading or writing is carried out with respect to the optical memory card held by the carriage.

* * * * *